United States Patent

[11] 3,548,944

[72] Inventor Patrick H. Hess
    Diamond Bar, Calif.
[21] Appl. No. 818,834
[22] Filed Apr. 23, 1969
[45] Patented Dec. 22, 1970
[73] Assignee Chevron Research Company
    San Francisco, Calif.
    a corporation of Delaware

[54] METHOD FOR SEALING EARTH FORMATIONS
    3 Claims, No Drawings
[52] U.S. Cl. .................................................. 166/295,
    61/36, 260/88.5
[51] Int. Cl. ...................................................... E21b 33/13;
    E02d 3/12
[50] Field of Search ............................................ 166/295,
    300; 61/36; 260/88.5, 671

[56] References Cited
    UNITED STATES PATENTS

| | | | |
|---|---|---|---|
| 2,456,628 | 12/1948 | Dunlop et al. | 260/88.5UX |
| 2,796,934 | 6/1957 | Vogel | 166/295 |
| 3,158,592 | 11/1964 | Nielsen | 260/88.5 |
| 3,199,590 | 8/1965 | Young | 166/295 |
| 3,347,947 | 10/1967 | Adams | 260/671 |
| 3,373,812 | 3/1968 | Smith | 166/295X |
| 3,393,739 | 7/1968 | Rosenberg | 166/295 |
| 3,437,145 | 4/1969 | Johnson et al. | 166/295 |

*Primary Examiner*—Stephen J. Novosad
*Attorneys*—A. L. Snow, F. E. Johnston and R. L. Freeland, Jr.

ABSTRACT: Porous earth formations are sealed by alternately injecting aluminum chloride red oil and furfuryl alcohol into the formations.

METHOD FOR SEALING EARTH FORMATIONS

BACKGROUND OF THE INVENTION

1. Field of the Invention

Oil field operators frequently must contend with the problem of poor distribution profiles in water injection wells and with the problem of excessive water influx in producing wells.

During secondary recovery of oil by water flood, it is frequently found that areas of high permeability exist at points along the interior of the well into which flood water is being injected. Instead of providing the desired uniform sweep through the formation, the flood water channels through zones of high permeability, "thief zones," and finds its way to a producing well without having served any useful purpose.

During production from many oil wells, very high water to oil ratios are observed in the production stream due to the flow of excessive amounts of water into the well from zones of high permeability in the formation.

These problems are well known in the petroleum industry and considerable effort has been expended in providing solutions for them by sealing off highly permeable areas of the formation.

2. Description of the Prior Art

U. S. Pat. No. 2,019,908 proposes to seal formations by injecting silicon tetrachloride into an earth formation where it hydrolyzes to form a solid deposit.

U. S. Pat. No. 2,014,119 proposes to inject a sodium salt of a sulfonic sludge acid and then a water solution of a calcium salt into an earth formation. The two materials react and deposit the calcium salt of the sludge acid in the interstices of the formation.

U. S. Pat. No. 2,248,028 proposes to inject styrene into an earth formation and polymerize the styrene in the interstices of the formation.

Other proposals to seal earth formations by producing a solid deposit or a polymer in the interstices of the formations are shown in U. S. Pat. Nos. 2,204,223, 2,208,766, 2,274,297, 2,348,484, 2,476,015, 2,492,212, and 2,674,322.

SUMMARY OF THE INVENTION

Pursuant to this invention, aluminum chloride red oil and furfuryl alcohol are alternately injected into earth formations where they react to form a hard bulky polymer-precipitate type solid which fills the interstices between formation particles and adheres to the particles. The red oil and alcohol are separately injected into the formation. After injection of a quantity of one of them and before injection of the other, a quantity of a liquid, chemically inert to both, such as diesel oil, is injected to keep the two apart and prevent chemical interaction during injection and before they become dispersed in the formation.

DESCRIPTION OF THE PREFERRED EMBODIMENTS

Aluminum chloride red oil is an aluminum chloride-hydrocarbon complex. It is usually available as a product formed during the use of aluminum chloride as an alkylation catalyst, spent aluminum chloride catalyst being removed from the alkylation reaction zone as red oil. Red oil is described in U. S. Pat. No. 3,347,947. It is a medium viscosity, highly reactive fluid composed of about one-third anhydrous aluminum chloride, one-third benzene, and one-third complex aromatic hydrocarbons. It reacts vigorously with water to form solid to semisolid aluminum hydroxides and hydrogen chloride, with high heat of reaction. Furfuryl alcohol is a low viscosity compound catalyzed by strong acids to form a hard, dense, thermosetting polymer much like Bakelite; this reaction is also accompanied by high heat release. Red oil and furfuryl alcohol react vigorously with each other to form a hard, filled-polymer resin. This reaction is thought to occur as follows: aluminum chloride or hydrogen chloride in red oil starts the polycondensation of furfuryl alcohol. Water produced from the polycondensation reacts with red oil to form more hydrochloric acid which, in turn, reacts with more furfuryl alcohol and further accelerates the polymerization. The heat of reaction dehydrates byproduct aluminum hydroxide, and also causes the hydrocarbon portion of red oil to char.

When aluminum chloride red oil and furfuryl alcohol are injected into the interstices of an earth formation and react there, the resulting solids fill the interstices and the polymer has a cementing effect bonding the solids formed to the formation particles and the formation particles to each other.

The effectiveness of the red oil-furfuryl alcohol to seal earth formations was first studied in cores of Berea and Boise sandstone. In a typical test the core is cleaned by washing with a chloroform-acetone mixture, dried at 120° C. and then vacuum saturated with distilled water. The water saturated core is placed in a Hassler cell and an overburden pressure of 350 p.s.i.g. is applied. Distilled water is forced through the core at varying pressures until constant permeability is observed at each pressure drop. The core is then flushed with diesel oil to remove water. Furfuryl alcohol is then injected into the core, it is followed by a diesel oil spacer and then by red oil.

In a typical core test a Berea sandstone core having a pore volume about 10 ml. and a water permeability about 250 md. was saturated with water. 5 ml. of diesel oil were injected into the core. This was followed by 5 ml. furfuryl alcohol, 2 ml. diesel oil and 2.7 ml. of aluminum chloride red oil. When 2.7 ml. of red oil had been injected, the core plugged and no further liquid could be forced through it at the 100 p.s.i.g. injection pressure. The core was then subjected to a head of distilled water at 140 p.s.i.g. and there was no flow.

Numerous core tests established the effectiveness of the red oil-furfuryl alcohol reaction product to seal a variety of cores taken from representative oil bearing formations. The red oil-furfuryl alcohol system was then tested at full scale in working wells, as shown in the following examples.

EXAMPLE 1

A California oil well was completed in Pliocene tar sands, stimulated with steam injection and produced. During an approximately 6 weeks' period the well produced 1,216 barrels of oil and 22,539 barrels of water. From the production it appeared obvious that the steam injected had been channeling and sealing of the channel paths was obviously prerequisite to obtaining representative production which would indicate the potential of the Pliocene tar sand.

A well survey indicated a thief zone at 2,185 feet. The hole was filled with sand to the base of the thief interval and the sand was capped with cement.

A first treatment was made by successively injecting into the formation 20 bbl. diesel oil, 50 bbl. red oil, 10 bbl. diesel oil, 5 bbl. furfuryl alcohol, 10 bbl. diesel oil, 30 bbl. red oil, 14 bbl. diesel oil, 5 bbl. furfuryl alcohol (containing radioactive scandium tracer), 5 bbl. diesel oil, 20 bbl. red oil, 10 bbl. diesel oil, and then water to force all fluids into the formation. The well was cleaned out and pressure tested. Further treatment was indicated.

A second treatment was made, injecting successively 50 cu. ft. diesel oil, 110 cu. ft. red oil, 5 cu. ft. diesel oil, 20 cu. ft. furfuryl alcohol, 5 cu. ft. diesel oil, 110 cu. ft. red oil, 5 cu. ft. diesel oil, 20 cu. ft. furfuryl alcohol, 5 cu. ft. diesel oil, 55 cu. ft. red oil, 3 cu. ft. diesel oil, 15 cu. ft. furfuryl alcohol, and 3 cu. ft. diesel oil. At this stage mixing of red oil and furfuryl alcohol in the injection tubing caused plugging. The tubing was drawn and replaced. The treatment was then completed, injecting successively 55 cu. ft. red oil, 3 cu. ft. diesel oil, 15 cu. ft. furfuryl alcohol, 3 cu. ft. diesel oil, 55 cu. ft. red oil, 3 cu. ft. diesel oil, 15 cu. ft. furfuryl alcohol and then water to displace all fluids into the formation.

The well was cleaned out, the formation was steam stimulated and the well was placed on production. Oil production was approximately 200 barrels per day and the water cut of the production stream was reduced from above 90° where it had been prior to treatment to 40 percent.

EXAMPLE 2

A water injection profile survey of an injection well of a water flood operation in the Rangely area indicated that most of the injection water entered the formation between 5,950 ft. and bottom, 6,013 ft. The water flood was directed at the interval 5,635 ft. to bottom. The high injection rate through the 63 ft. interval precluded efficient flood operation.

The high injectivity area was packed off and treated y by injection of red oil and furfuryl alcohol. The injection sequence was 10 bbl. diesel oil, 85 bbl. red oil, 5 bbl. diesel oil, 5 bbl. furfuryl alcohol, 10 bbl. diesel oil and 23 bbl. of water. Due to some reaction of red oil and furfuryl alcohol in the injection tubing, plugging occurred and the last 35 bbl. of fluid injected remained in the tubing instead of reaching the formation.

The well was put back into water injection service. An injection profile survey showed 35 percent of the injection water entering the formation above 5,764 ft.; prior to treatment no water had entered the formation above this level.

After treatment, water injection stabilized at 930 bbl. per day at 1,560 p.s.i.g. Prior to treatment the stabilized rate had been 2,500 bbl. per day at 1,350 p.s.i.g.

The effectiveness of the injection well was markedly improved by the treatment.

EXAMPLE 3

A producing well in the Coalinga area developed a corrosion hole in the casing at 255 feet. Large amounts of water entered the production stream through the corrosion hole.

A bridge plug was set below the leak and covered with a protective layer of sand. The formation adjacent the casing leak was sealed by injecting in sequence 2 bbl. diesel oil, 3 bbl. furfuryl alcohol, 2 bbl. diesel oil, and 4 bbl. of red oil.

After treatment, the casing held 600 p.s.i.g. surface pressure.

When the well was put back on production there was no water entry from the corrosion hole.

Another manner of using the red oil-furfuryl alcohol product to seal earth formations is illustrated in the following example.

EXAMPLE 4

Oil seepage through the earthen wall of a refinery waste oil reservoir threatened to create a water pollution problem. The reservoir was emptied and the interior surface of the earthen wall was sprayed with red oil. Furfuryl alcohol was then sprayed on the surface of the earthen wall. A vigorous reaction occurred and an adherent, tough, rubbery, nonporous coating was formed on the earthen wall. The reservoir was refilled with waste oil and water and continued in service. After six months' service the wall continued impervious to seepage.

The foregoing examples provide clear evidence of the effectiveness of the red oil-furfuryl alcohol treatment of earth formations to reduce permeability.

It should be noted that the relative volumes of red oil and furfuryl alcohol used can be varied considerably. In large scale sealing undertakings it is preferred to use a substantial volume excess of red oil, e.g., 2 to 5 volumes of red oil per volume of furfuryl alcohol. The red oil in excess of that required to cause polymerization of the furfuryl alcohol reacts with formation water and lays down solid deposits which assist in the sealing process.

The liquid employed as a spacer between the red oil and furfuryl alcohol injections may be any liquid which is inert to both of them. Crude oil or crude oil distillates are excellent spacer fluids.

The formation should be reasonably free of interstitial water when the red oil is injected. Injection of the same liquid used as a spacer prior to injection of red oil is a convenient and effective way to displace interstitial water.

I claim:
1. The method of sealing permeable earth formations, which comprises introducing aluminum chloride red oil into the formation and promptly thereafter introducing furfuryl alcohol into the formation.
2. The method of sealing a permeable earth formation, which comprises alternately injecting aluminum chloride red oil and furfuryl alcohol into the formation and at each alternation of the liquid being injected, injecting a spacer liquid inert to both the red oil and the alcohol to keep the red oil and alcohol apart until they have entered the formation.
3. The method of sealing a highly permeable zone in an oil well, which comprises injecting a liquid inert to both aluminum chloride red oil and furfuryl alcohol into the zone to displace formation water, then alternately injecting aluminum chloride red oil and furfuryl alcohol into the formation, and at each alternation of the liquid being injected, injecting a quantity of said inert liquid to prevent intimate contact between the red oil and the alcohol until they enter the formation.